US009055860B2

(12) United States Patent
Roberson et al.

(10) Patent No.: US 9,055,860 B2
(45) Date of Patent: Jun. 16, 2015

(54) ACCESSORY FOR DISHWASHER
(71) Applicant: BSH Home Appliances Corporation, Irvine, CA (US)
(72) Inventors: Lindsay Roberson, Durham, NC (US); Charlie Pipkin, New Bern, NC (US)
(73) Assignee: BSH Home Appliances Corporation, Irvine, CA (US)
( * ) Notice: Subject to any disclaimer, the term of this patent is extended or adjusted under 35 U.S.C. 154(b) by 0 days.
(21) Appl. No.: 14/251,671
(22) Filed: Apr. 14, 2014
(65) Prior Publication Data
US 2014/0217869 A1 Aug. 7, 2014

Related U.S. Application Data

(60) Division of application No. 13/966,309, filed on Aug. 14, 2013, now Pat. No. 8,783,472, which is a continuation of application No. 13/332,508, filed on Dec. 21, 2011, now Pat. No. 8,579,121, which is a continuation-in-part of application No. 29/393,079, filed on May 31, 2011, now Pat. No. Des. 668,401.

(51) Int. Cl.
*A47G 19/08* (2006.01)
*A47G 29/00* (2006.01)
(Continued)

(52) U.S. Cl.
CPC ............... *A47L 15/505* (2013.01); *A47B 81/04* (2013.01); *A47L 15/503* (2013.01); *A47L 19/04* (2013.01);
(Continued)

(58) Field of Classification Search
CPC ..... A47L 15/505; A47L 15/50; A47L 15/501; A47L 15/42; A47L 15/503; A47L 15/507; A47L 19/04; A47L 15/502; A47L 19/00; A47L 15/14; A47L 15/504; A47L 17/02; A47L 15/48; A47F 7/0064; A47F 5/01; A47F 5/083; A47F 7/148; A47F 5/14; A47F 5/13; A47F 3/147; A47F 5/005; A47F 5/10; A47B 57/581; A47B 55/02; A47B 81/04; A47B 45/00; A47B 73/002; A47B 87/001; A47B 57/58; A47B 57/583; A47J 47/16; A47G 25/24; A47G 61/1646
USPC ................ 211/41.9, 184, 181.1, 50, 45, 41.7, 211/41.8, 43, 41.5, 41.4, 85.15, 11, 12, 195, 211/175, 183; 312/228.1; D32/1-3, 25; 134/56 D, 57 D, 58 D, 201; 220/488, 220/555; 68/212
See application file for complete search history.

(56) References Cited

U.S. PATENT DOCUMENTS 542,734 A 7/1895 Johnson
851,571 A 4/1907 Timberlake
(Continued)

FOREIGN PATENT DOCUMENTS

CA 142075 4/2012
EP 2332458 A1 6/2011
EP 2335548 A1 6/2011

OTHER PUBLICATIONS

GF Bottle Holder, Miele & CIE, accessed Dec. 21, 2011.
(Continued)

*Primary Examiner* — Jennifer E Novosad
(74) *Attorney, Agent, or Firm* — James E. Howard; Andre Pallapies

(57) ABSTRACT

An accessory for supporting crockery in a dishwasher comprises a generally U-shaped main body having a pair of legs and a connecting portion that connects the pair of legs, at least one of the legs having a free end that is adapted to be releasably attached to a crockery basket in the dishwasher when in an installation position, and a smoothly radiused portion connecting each leg to the connecting portion, wherein the legs are spaced apart in the installation position a sufficient distance to promote stability of the crockery.

15 Claims, 12 Drawing Sheets

(51) Int. Cl.

| | | |
|---|---|---|
| *A47B 43/00* | (2006.01) | |
| *A47B 47/00* | (2006.01) | |
| *A47B 57/00* | (2006.01) | |
| *A47F 5/00* | (2006.01) | |
| *A47F 5/01* | (2006.01) | |
| *A47F 7/00* | (2006.01) | |
| *A47L 15/50* | (2006.01) | |
| *A47B 81/04* | (2006.01) | |
| *A47L 19/04* | (2006.01) | |
| *A47J 47/16* | (2006.01) | |

(52) U.S. Cl.
CPC ............... *A47J 47/16* (2013.01); *A47L 15/501* (2013.01); *A47F 5/01* (2013.01); *A47F 7/0064* (2013.01); *A47L 15/50* (2013.01)

(56) References Cited

U.S. PATENT DOCUMENTS

| | | | |
|---|---|---|---|
| RE12,711 E | | 10/1907 | Twitchell |
| 869,996 A | | 11/1907 | Timberlake |
| 895,211 A | | 8/1908 | Twitchell |
| 2,519,711 A | | 8/1950 | Sprechmann |
| 2,629,498 A | | 2/1953 | Marasigan |
| 2,665,267 A | | 10/1953 | Planeta |
| 2,708,037 A | * | 5/1955 | Planeta ........................... 211/74 |
| 2,841,288 A | * | 7/1958 | Field et al. ................... 211/41.4 |
| 2,971,652 A | | 2/1961 | Getchell et al. |
| 2,971,668 A | | 2/1961 | Peglow |
| 3,167,183 A | | 1/1965 | Claywell et al. |
| 3,305,102 A | | 2/1967 | Saphirstein |
| 3,612,285 A | | 10/1971 | Mason |
| 4,023,682 A | | 5/1977 | Niece |
| 4,046,261 A | | 9/1977 | Yake |
| 4,183,437 A | | 1/1980 | Crawford et al. |
| 4,577,764 A | | 3/1986 | Silka et al. |
| 4,593,822 A | * | 6/1986 | Yeaney et al. ................ 211/41.8 |
| 4,927,033 A | | 5/1990 | Paters et al. |
| 5,351,837 A | | 10/1994 | Smith |
| 5,405,018 A | * | 4/1995 | Anthrop, Jr. .................. 211/41.9 |
| 5,601,195 A | * | 2/1997 | Finola et al. .................. 211/41.8 |
| 5,794,792 A | | 8/1998 | Convertino |
| 6,015,051 A | | 1/2000 | Battaglia |
| 6,364,131 B1 | * | 4/2002 | Moylan ......................... 211/41.9 |
| 6,460,710 B1 | | 10/2002 | Dardashti |
| 6,557,567 B2 | * | 5/2003 | Mood ......................... 134/22.18 |
| 6,848,585 B2 | | 2/2005 | VanLandingham |
| 7,766,175 B2 | | 8/2010 | Jadhav et al. |
| 7,793,790 B2 | * | 9/2010 | Lee ............................... 211/41.9 |
| 7,896,171 B2 | | 3/2011 | Battaglia |
| 7,931,155 B2 | | 4/2011 | Bastuji |
| 7,950,537 B1 | | 5/2011 | Goodman et al. |
| 2001/0047968 A1 | | 12/2001 | Wright |
| 2003/0164344 A1 | | 9/2003 | Parks |
| 2004/0065629 A1 | | 4/2004 | Hunt et al. |
| 2004/0089619 A1 | | 5/2004 | Plutsky |
| 2005/0241686 A1 | | 11/2005 | Woo |
| 2006/0108298 A1 | | 5/2006 | Kim |
| 2006/0254992 A1 | | 11/2006 | Lim |
| 2007/0199908 A1 | | 8/2007 | Kasden et al. |
| 2007/0247039 A1 | | 10/2007 | Anderson et al. |
| 2007/0277857 A1 | | 12/2007 | Schessl et al. |
| 2008/0083678 A1 | | 4/2008 | Graute |
| 2009/0050585 A1 | | 2/2009 | Lindgreen et al. |
| 2009/0065452 A1 | | 3/2009 | Smith |
| 2009/0090681 A1 | | 4/2009 | Graute |
| 2011/0025179 A1 | | 2/2011 | Haltmeyer et al. |
| 2012/0292269 A1 | | 11/2012 | Klump et al. |
| 2012/0292270 A1 | | 11/2012 | Klump et al. |

OTHER PUBLICATIONS

BSH Bosch and Siemens Hausgeräte GmbH, Bottle Retainer, Fabrication specification sheet, Aug. 29, 2011, Dilligen, Germany.
Report of Examination CA 145,672, dated Jul. 20, 2012.
Bosch, 2009 Home Appliance Full Product Line, catalog printed Jul. 2009, featuring p. 23 Dishwasher Accessory Kit.

* cited by examiner

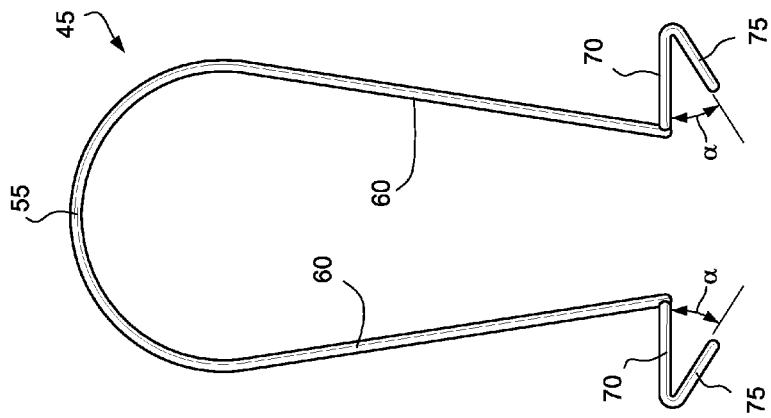
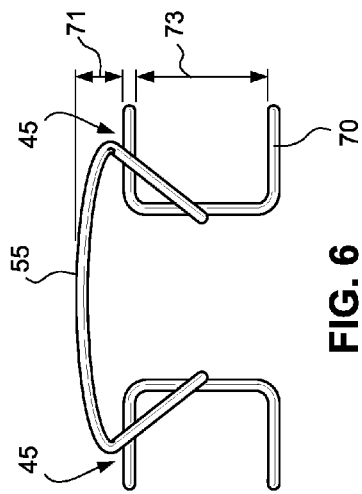
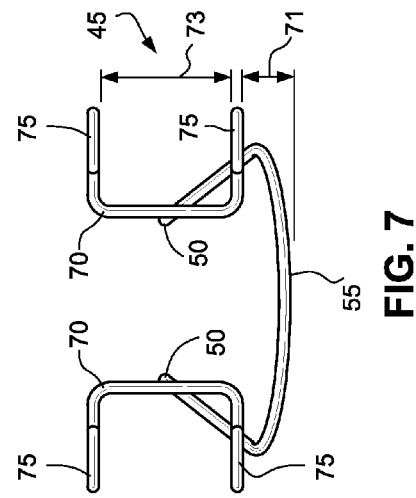
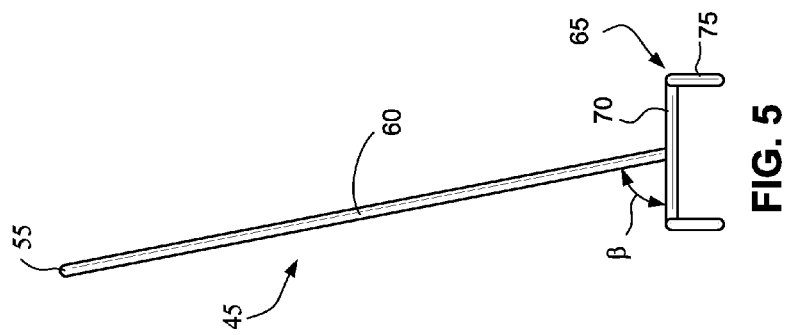

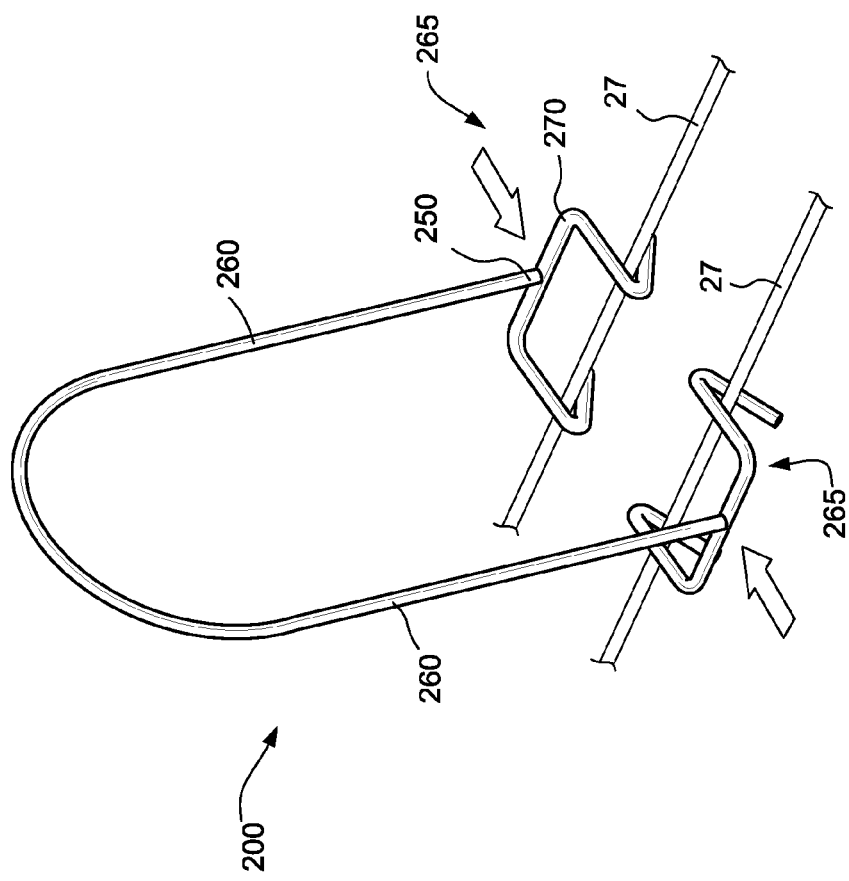

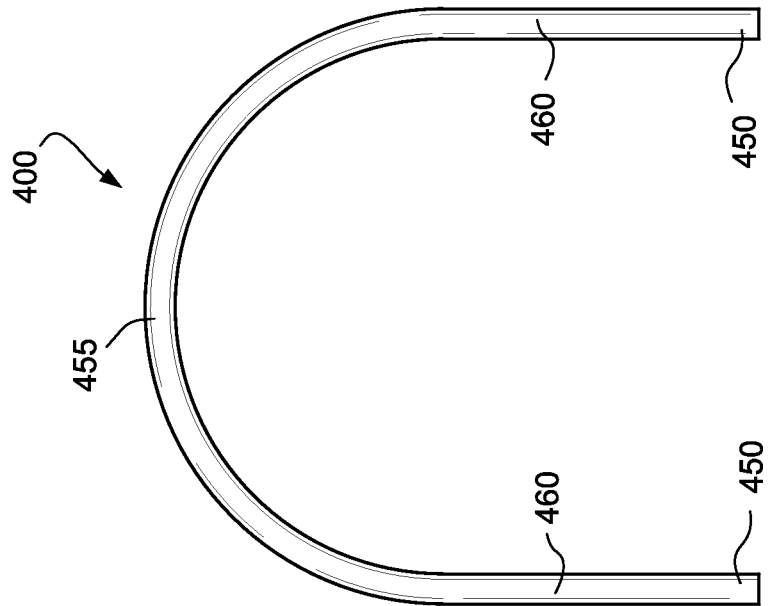
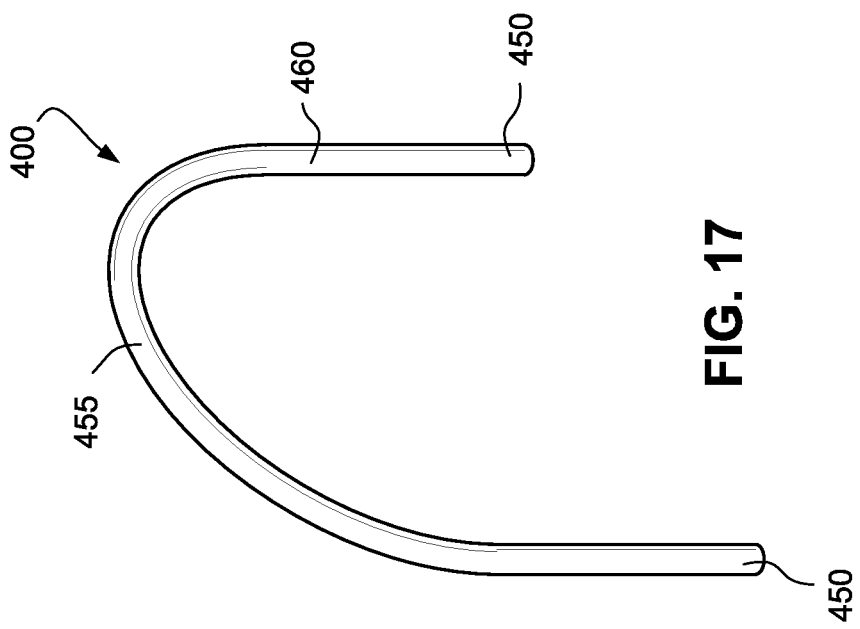

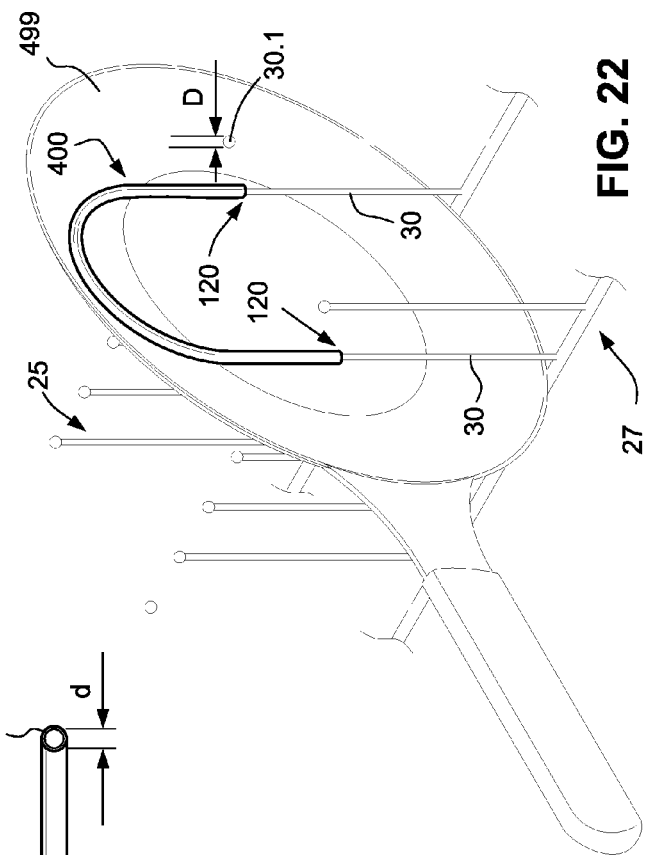
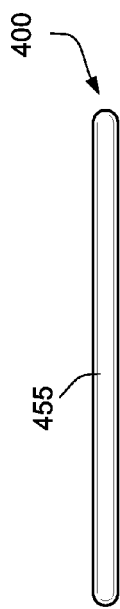
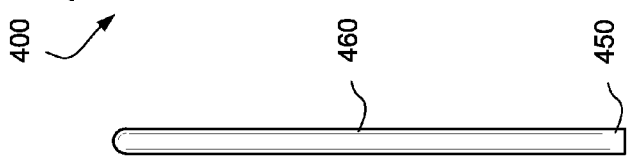

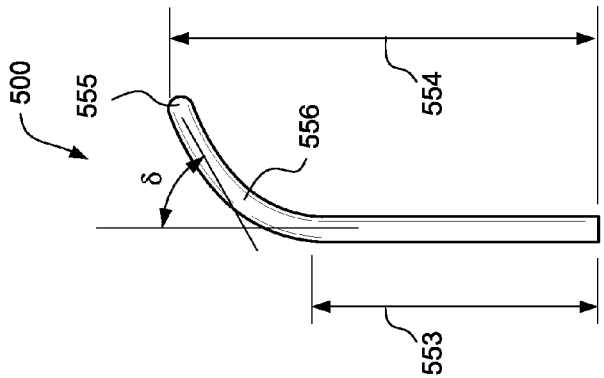
FIG. 27
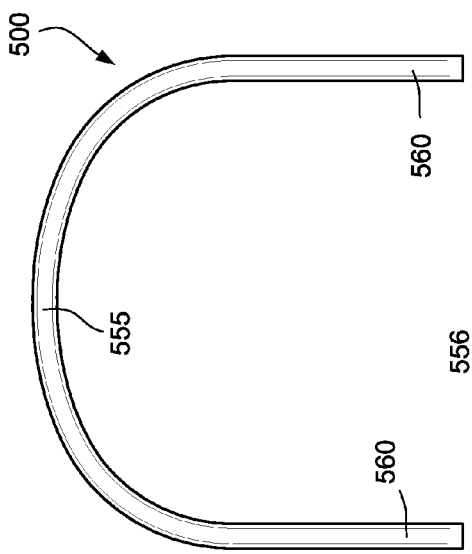
FIG. 24
FIG. 25
FIG. 26
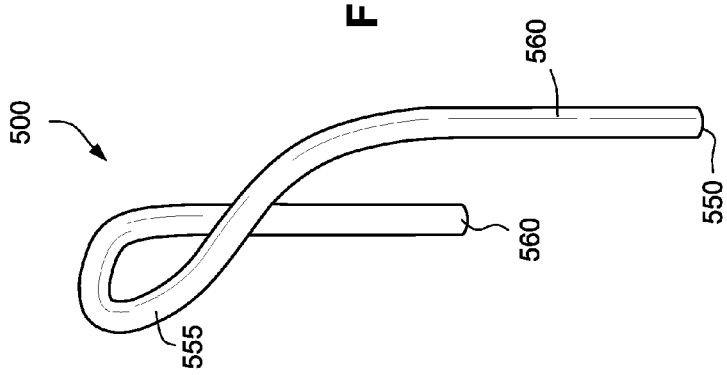
FIG. 23

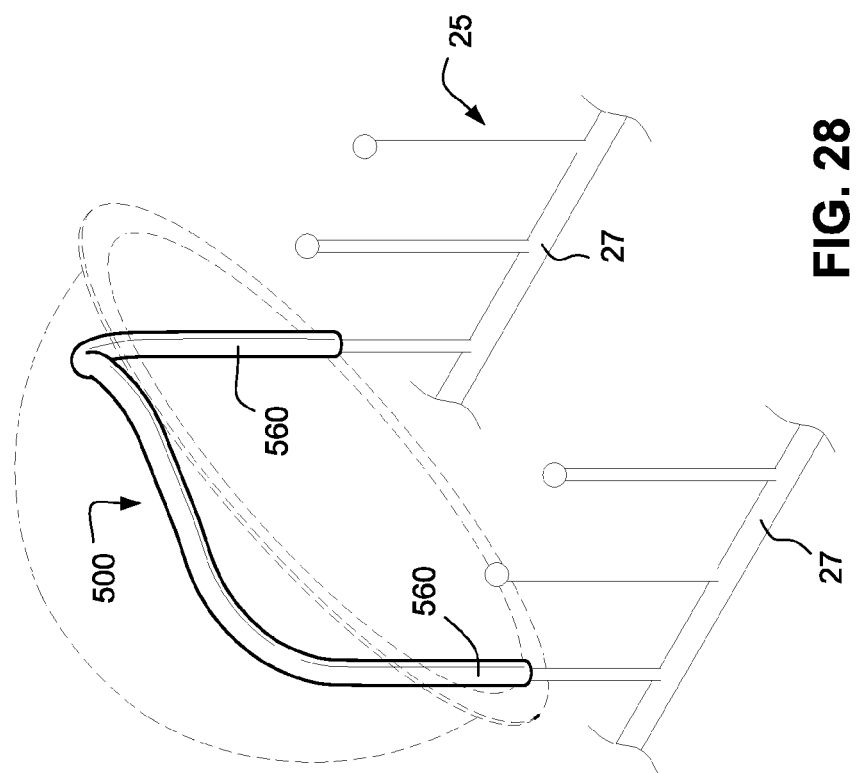

ACCESSORY FOR DISHWASHER

CROSS-REFERENCES TO RELATED APPLICATIONS

This application is a divisional application, under 35 U.S.C. §121, of U.S. application Ser. No. 13/966,309, filed Aug. 14, 2013, which is a continuation, under 35 U.S.C. §120, of U.S. application Ser. No. 13/332,508, filed Dec. 21, 2011, which is a continuation-in-part of U.S. application Ser. No. 29/393,079, filed May 31, 2011, now U.S. Pat. No. D668,401, issued Oct. 2, 2012, incorporated herein by reference in its entirety.

BACKGROUND OF THE INVENTION

A dishwasher removes unwanted foreign substances from reusable crockery and utensils using washing liquid injected through an injection nozzle. The nozzle may be located in various locations inside the dishwasher, e.g., typically directly beneath the dishes, or, in the case of U.S. Pat. No. 3,167,183, may be located beside the dishes. The removed substances then drop to the bottom of a tub beneath the dishes.

Typically, a dishwasher contains at least one crockery basket or rack, usually two, each with a number of upstanding tines to hold the crockery in an upright position to allow for maximum cleaning. Occasionally, as shown in U.S. Pat. No. 7,793,790 B2, dishwashers will contain a bottle rack for separately placing dishware products having a hollow shape, such as milk bottles and feeding bottles, in a vertical position to maximize cleaning. As shown in U.S. Pat. No. 4,927,033, an article holder for the dish rack of a dishwasher is provided for securely holding cup shaped articles in an upright position on the sides of the basket. In U.S. Pat. No. 2,655,267 a detachable device to prevent damage to glasses and cups from heavier metal instruments by more forcefully supporting the objects is disclosed. U.S. Pat. No. 4,593,822 discloses an arrangement to prevent damage to dishware due to the deterioration of coatings of a wire rack due to continued exposure to high levels of heat by introducing a removable and replaceable sleeve. As shown in U.S. Pat. No. 2,841,288, plates are occasionally held in place by tilted racks on both sides and with raised lower supports extending from one tilted rack to the other, and also holding the dish. In addition to dishes, specific types of reusable bags can also be washed in dishwashers, using the special dishwasher attachment shown in U.S. Pat. No. 5,405,018. Also known is an accessory which may be clamped in an upright manner to an existing basket, to hold a baby bottle.

A need has developed to address one or more shortcomings of the prior art.

BRIEF SUMMARY OF THE INVENTION

One aspect of the present technology is directed to a dishwasher accessory to hold or help hold in place various items of crockery to maximize the support given to these items to help prevent them from falling over and/or being cleaned improperly.

In one example, a dishwasher accessory may be removably secured to a rack of the dishwasher in such a way as to blend with the existing structure of the rack, in a space conserving manner. For example, the dishwasher accessory may have a main body with a distal end that is aligned with the tines, but extends to a height that is greater than the height of the tine.

In one example, a dishwasher accessory is attachable to one or more existing tines of a dishwasher, e.g., by providing the accessory with hollow ends than can be slid over the existing tines.

The accessory may have a predefined shape, or it may be deformable, e.g., in one of three ways: elastically, plastically or in a plurality of predetermined positions, similar to how a drinking straw with corrugations is adjustable.

In another example of the present technology, there is provided an accessory for supporting crockery in a dishwasher, the accessory comprising a generally U-shaped main body having a pair of legs and a connecting portion that connects the pair of legs, at least one of the legs having a free end that is adapted to be releasably attached to a crockery basket in the dishwasher when in an installation position, and a smoothly or gently radiused portion connecting each leg to the connecting portion, wherein the legs are spaced apart in the installation position a sufficient distance to promote stability of the crockery. The sufficient distance maybe about 4-15 cm, or about 8-12 or about 5-8 cm, or at least 4 cm.

In another example of the present technology, there is provided an accessory for a dishwasher having at least one crockery basket with a base and upstanding tines extending at an angle relative to the base, said accessory comprising a main body having a proximal end for connection to the crockery basket, and a distal end extending away from the proximal end, e.g., in cantilever fashion, wherein the distal end is angled to match the angle at which the upstanding tines of the crockery basket are oriented and dimensioned to extend a height that is greater than the height of the tines.

In another example of the present technology, there is provided an accessory for a dishwasher for washing crockery, the dishwasher having at least one crockery basket, said accessory comprising a main body having a proximal end for connection to the crockery basket, and a distal end extending away from the proximal end in cantilever fashion, wherein the main body, e.g., distal end, is adjustable in dependence on shape and/or size of the crockery.

These and other aspects of the present technology will be described in or apparent from the following detailed description.

BRIEF DESCRIPTION OF THE DRAWINGS

FIG. 5 is a left side view thereof;

FIG. 6 is a top view thereof;

FIG. 7 is a bottom view thereof;

FIG. 8 is a front view thereof;

FIG. 9 is a perspective view of an accessory according to another example of the present technology;

FIG. 17 is a perspective view of an accessory according to another example of the present technology;

FIG. 18 is a front view thereof;

FIG. 19 is a side view thereof;

FIG. 20 is a top view thereof;

FIG. 21 is a bottom view thereof;

FIG. 22 is a perspective view thereof in an installation position relative to a basket and supporting a relatively flat pan or plate;

FIG. 23 is a perspective view of an accessory according to still another example of the present technology;

FIG. 24 is a front view thereof;

FIG. 25 is a top view thereof;

FIG. 26 is a bottom view thereof;

FIG. 27 is a side view thereof; and

FIG. 28 is a perspective view thereof in an installation position relative to a basket and supporting a relatively deep dish bowl or pot.

DETAILED DESCRIPTION

The present technology is described in relation to several examples that may share one or more common features. It should be noted that an aspect of one example can be combined with an aspect of another example, and that any aspect of any example may form the basis for subject matter applicant may wish to pursue.

Figure 1:
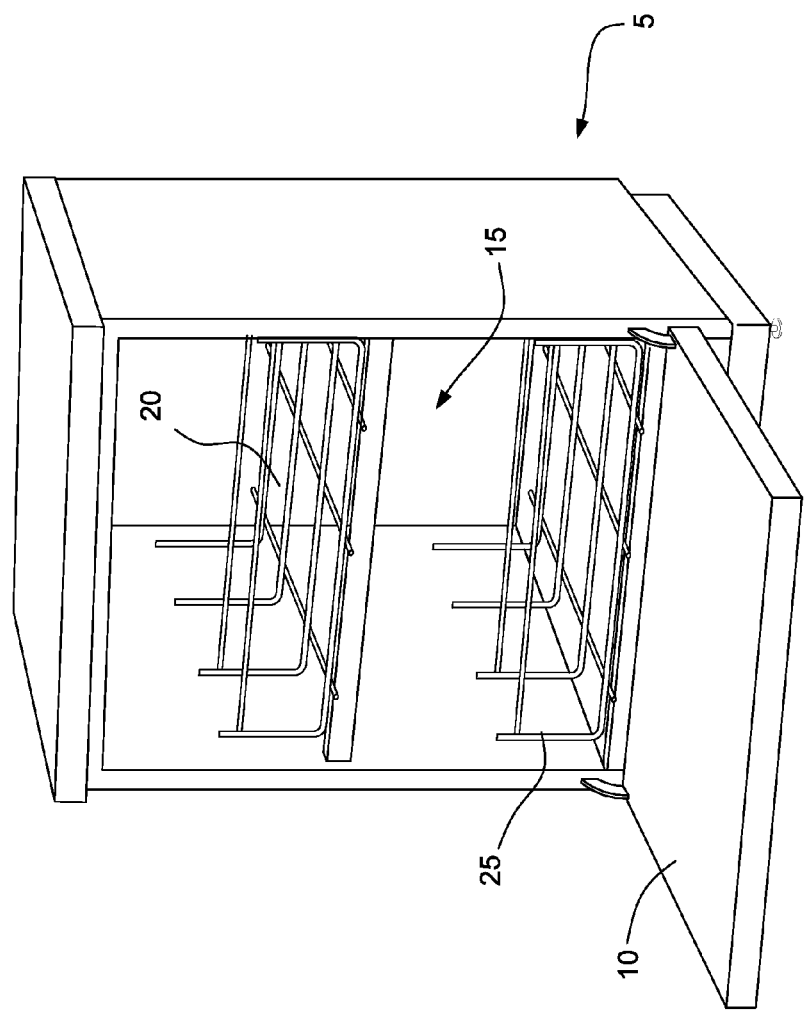
FIG. 1 is a schematic perspective view of a dishwasher according to an example of the present technology.

FIG. 1 is a schematic view of a dishwasher 5 for washing and/or drying crockery items, such as dishes, frying pans, cookie sheets, cutting boards, bowls, pots, etc. Dishwasher 5 includes a manually openable door 10 and a compartment 15. Door 10 is openable to allow access to the compartment 15. Door 10 will form a generally water/air tight seal relative to the compartment 15 when closed. The compartment 15 includes at least one crockery basket 20, 25.

Figure 2:
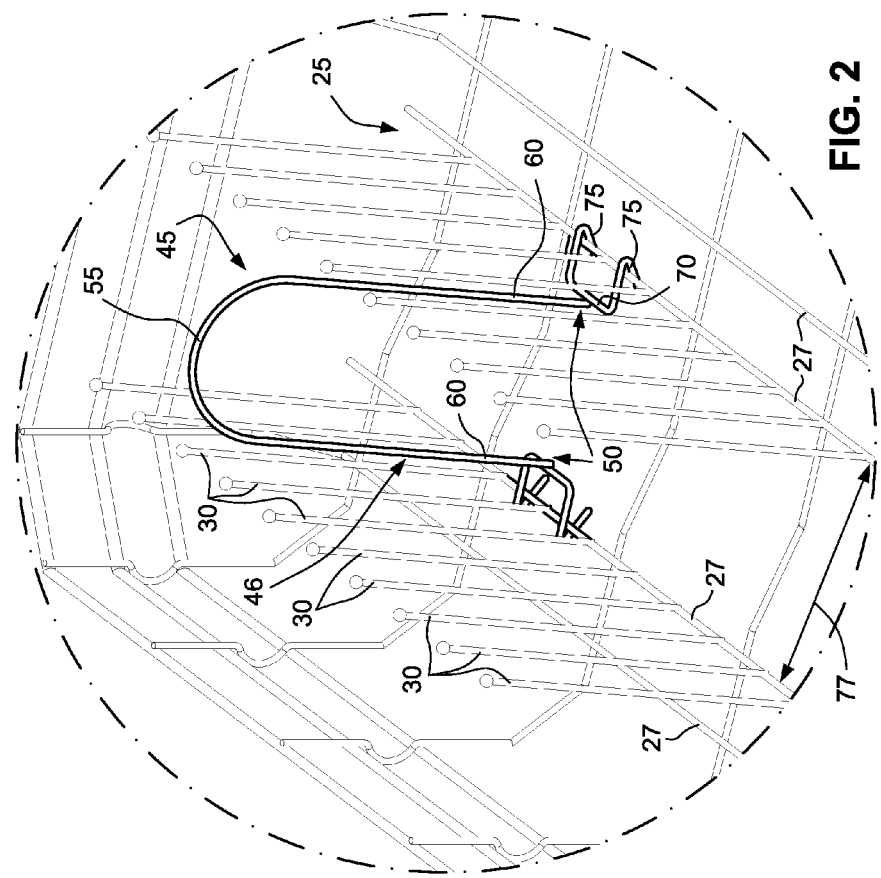
FIG. 2 is a partial view of a crockery basket including an accessory according to an example of the present technology.

FIG. 2 shows further details of a portion of the sample crockery basket 25, within which are several rows of generally parallel base rails 27 and upright tines 30, generally used to support the items of crockery to maximize cleaning efficiency. However, sometimes the existing tines 30 are not enough to fully and/or optimally stabilize larger and/or irregular items, in a space conserving manner, in which case such items may not be fully washed/rinsed, or they may impact the loading/cleaning efficiency of surrounding items. There are several different designs for the dishwasher accessories, and each one may be specifically designed to support a different type of crockery item, or they may be adjustable.

FIGS. 2 through 8 show a first example of a dishwasher accessory 45 of the present technology. The dishwasher accessory 45 attaches or is otherwise provided to the crockery basket 20, in an easily removable manner. Dishwasher accessory 45 can be provided to the base rail 27, existing tines 30, or even sides of the basket 25.

As shown in FIG. 2, accessory 45 has a main body 46, a proximal end 50 that is attached to the basket and a distal end 55 that extends away from the distal end 50. The accessory 45 may have a generally U-shape, including a pair of legs 60 and a connecting portion 56 (FIG. 4) although other shapes are contemplated. The U-shape is able to better fit the contour of dishes and other crockery and avoids the potential for sharp points (e.g., from existing tines) that may cause damage to the crockery and/or premature wear on the accessory itself, which may be a malleable wire coated with a soft layer, e.g., plastic, etc.

The spacing between the legs may be about 4-15 cm, e.g., 5-8 cm, or 8-12 cm (or roughly about 95 mm) to ensure adequate contact with the crockery, and/or to best ensure stability of the crockery in an upright or optimal cleaning position that can robustly withstand the various cleaning/rinsing cycles which occur in a dishwasher. If the distance between the legs is less than 4 cm, then the stability of the crockery may be compromised, and if the distance is greater than about 15 cm, then the accessory will be wider than a large percentage of the crockery that is intended to be supported by the accessory.

The U-shape may also include smooth, radiused transitions 57 (FIG. 4) between the legs 60 of the U-shape and the connecting portion 56 or distal end 55 of the U-shape, to enhance stable support. The distal end 55 and/or the radiused transitions 57 are intended to support the crockery.

Each leg 60 of the U shape may include an attaching member for attaching to the base rails 27 of the basket 25. In FIG. 2, each end of the legs 60 includes an attaching member in the form of a claw 65, one attached or otherwise provided to each leg 60 of the accessory. Each claw 65 includes a cross member 70 and at least one hook member 75, with two such hook members for each claw 65 being shown in the example of FIG. 2. The hook members 75 are spaced to provide sufficient stability.

Figure 3:
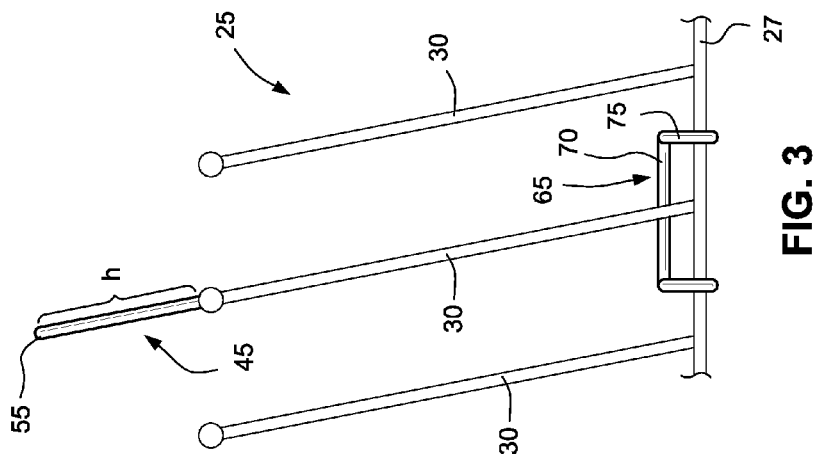
FIG. 3 is a side view thereof showing an exposed height differential between the accessory and the tines of a crockery basket.

FIGS. 2 and 3 show the accessory 45 in the attached or installation position relative to the basket 25. As shown in FIG. 3, the angle of the main body 46 is selected to match the angle of the existing tines 30 (part of the accessory 45 is hidden behind the tine 30), which helps to ensure that the accessory blends 45 with the basket 25, to help maintain maximum loading capacity and cleaning efficiency. The main body 46, e.g., the distal and/or proximal ends 50, 55 of the accessory 45 can be adjustable relative to the cross member 70, e.g., by using deformable materials such as malleable wires, to allow the angle of tines to be matched.

FIG. 3 shows the distal end 55 of the accessory 45 to extend an exposed height h that is greater than the height of the tines 30, e.g., in the range of about 5-10 cm. The accessory has an overall height of approximately 10-20 cm.

Figure 4:
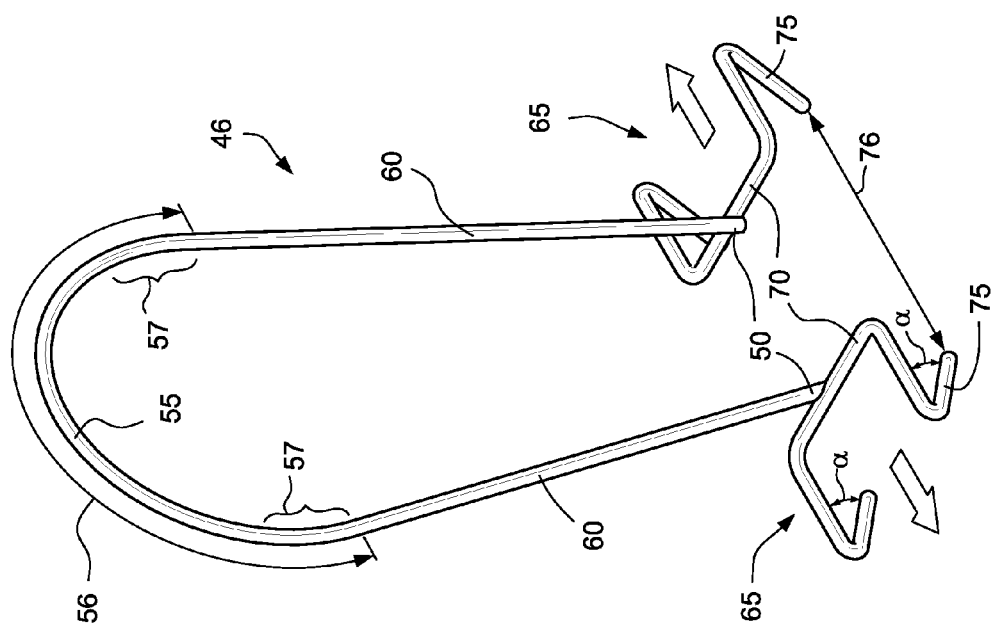
FIG. 4 is a perspective view thereof.
Figure 11:
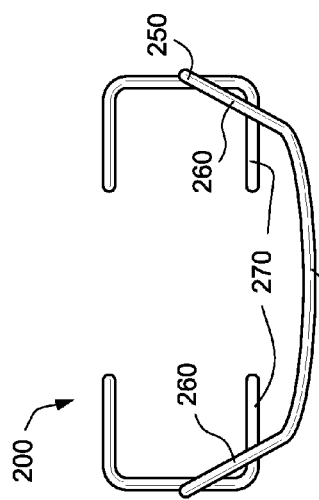
FIG. 11 is a top view thereof.
Figure 12:
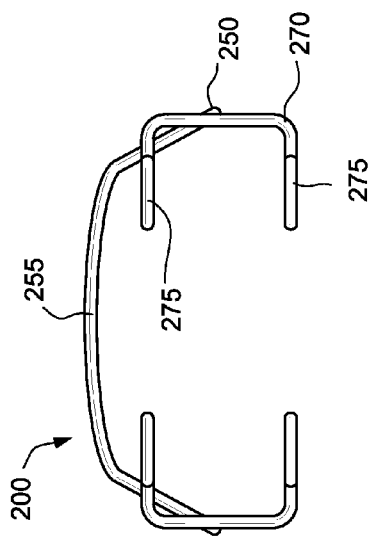
FIG. 12 is a bottom view thereof.

While FIGS. 2 and 3 show the accessory in the attached or installation position, FIG. 4 shows the accessory in the pre-attached, pre-installation position. As shown in FIG. 4, the legs 60 are pulled outwards from both sides in the directions indicated by the arrows until the distance 76 between the claws 65, and more particularly the tips of the hooks 75, is more than the distance 77 (FIG. 2) between the base rails 27. Once the legs 60 are stretched to achieve this distance, they are released at which point the resiliency of the legs causes the hooks 75 to "snap" in and firmly engage the respective rails 27. It can be appreciated that the legs 60 in FIG. 4 converge towards one another as seen in the direction of the proximal end 50 of the accessory 45, but the legs 60 are generally parallel once the accessory 45 takes up the attached position (FIG. 2).

FIG. 4 shows that the hook 75 is formed at an angle α relative to the cross member 70 of the claw 65. FIG. 8 shows the accessory 45 from the front, making more apparent the angle α between the cross 75 and the hook 80 that makes supporting larger crockery easier. The angle α is in the range of 5-45 degrees, or about 10-30 degrees.

FIG. 5 shows the accessory in side view, including the angle β that is between the proximal end 50 and the cross member 70. Angle β is in the range of about 45 to less than 90 degrees or about 60-75 degrees. The angles α and β may be adjustable, e.g., by making the accessory of spring wire that can be deformed.

Adjustability may be provided in the form of an adjustment mechanism, e.g., to allow selection of two or more predetermined positions, e.g., like corrugations in a drinking straw may allow the tip of the straw to assume a number of positions. As seen in FIGS. 6 and 7, the angle β may result in the distal end 55 of the accessory being positioned slightly outward of an extent 73 between the hooks 75. Although the distal end 55 is shown to project a small distance 71 (e.g., of a few millimeters, e.g., 1-10 mm) outside one of the hooks 75, the distal end 55 may be positioned within the extent 73 and between the claws as seen in FIGS. 6 and 7. Such configuration helps to provide stability (given the distance between the hooks) and at the same time allow the angle β to match the angle of the tines in the basket.

FIGS. 9 through 13 show a second example of a dishwasher accessory 200 according to the present technology. Accessory 200 is similar to accessory 45 and thus parts that operate in the same manner will not be repeated for the sake of conciseness, where like reference numbers indicate like parts. Accessory 200 differs from accessory 45 in a variant on the way that it can be attached to the crockery basket's base rails 27. As shown in FIG. 9, the claws 265 are rotated 90° compared to the claws 65 shown in FIGS. 2-8. The claws 265 may be fixedly attached in this manner, or they can be adjustable via an adjustment mechanism, e.g., the proximal end 250 may be swiveable or rotatable relative to the cross member 270. When in this position, the claws 265 can be squeezed in the direction indicated by the arrows against the natural resiliency of opposed legs 260 of the accessory, which again has a generally U-shape. This is in contrast to the pulling the legs outwards in relation to accessory 45.

Figure 10:
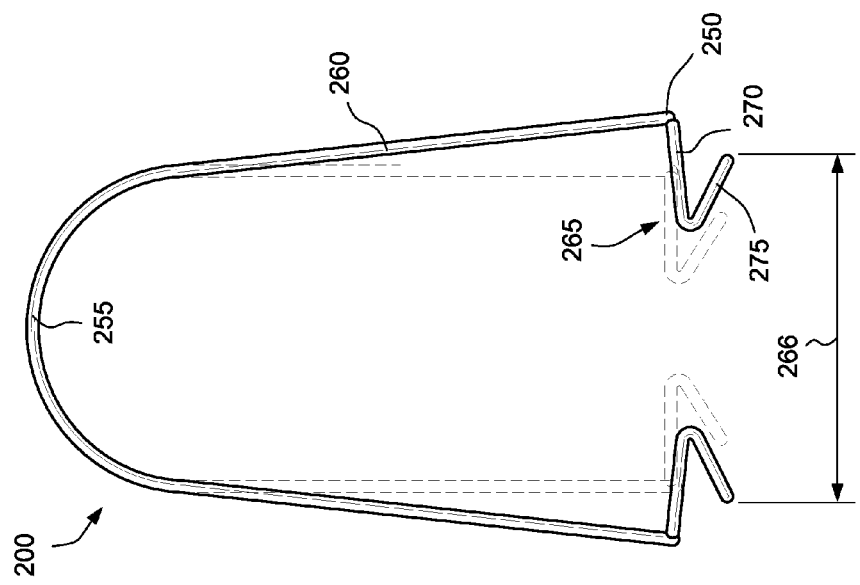
FIG. 10 is a front view thereof.

FIG. 10 features the accessory 200 in a relaxed, pre-installation position (solid lines) as well as in the installation position (broken lines). Again, the legs 260 are generally parallel to one another in the installation position, and generally not parallel (diverging away from one another in the direction of the proximal ends 250) in the pre-installation position. As compared to accessory 45, a distance 266 between the claws may be less than the distance 76 between the claws as shown in FIG. 4, which distance may be more useful if the base rails 27 of the basket 25 are closer to one another.

Figure 14:
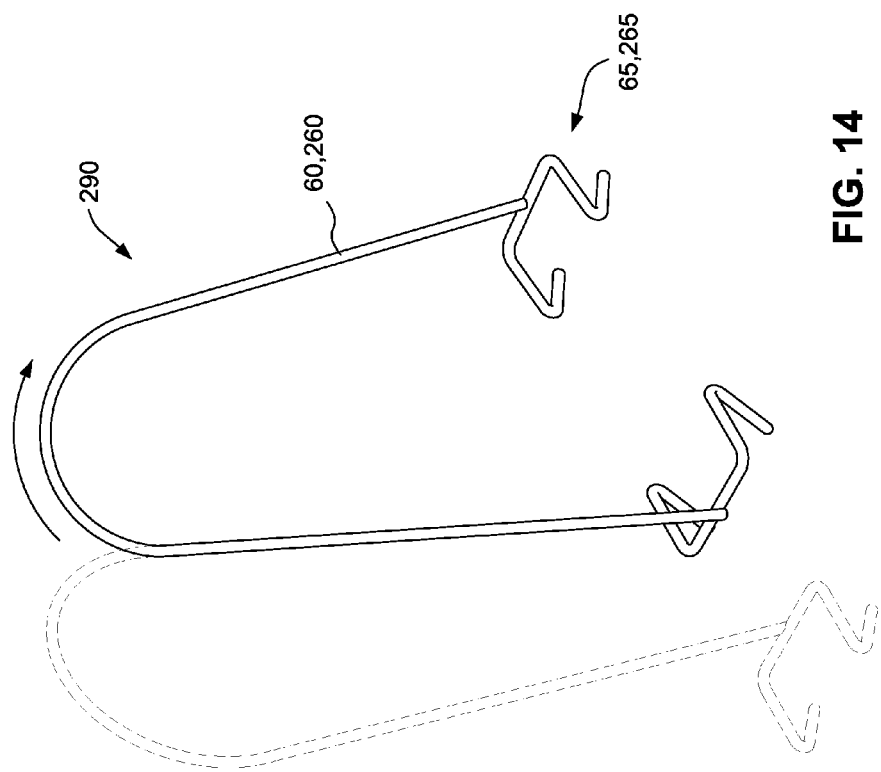
FIG. 14 is a perspective view of an accessory according to still another example of the present technology.
Figure 13:
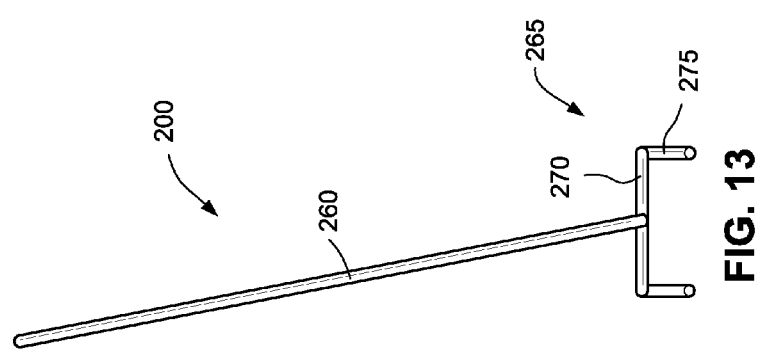
FIG. 13 is a side view thereof.

As shown in FIG. 14, an accessory 290 can also be manufactured of a material (e.g., spring wire) that that allows the claws 65, 265 to be positioned in either the inwardly facing orientation (FIGS. 2-8) or alternatively the outwardly facing orientation (FIGS. 9-13). FIG. 14 shows the inwardly facing orientation in the broken lines, which can be converted into the solid line orientation by bending one leg 60, 260 over the distal end as indicated by the arrow until the claws 65, 265 face away from one another.

Figure 16:
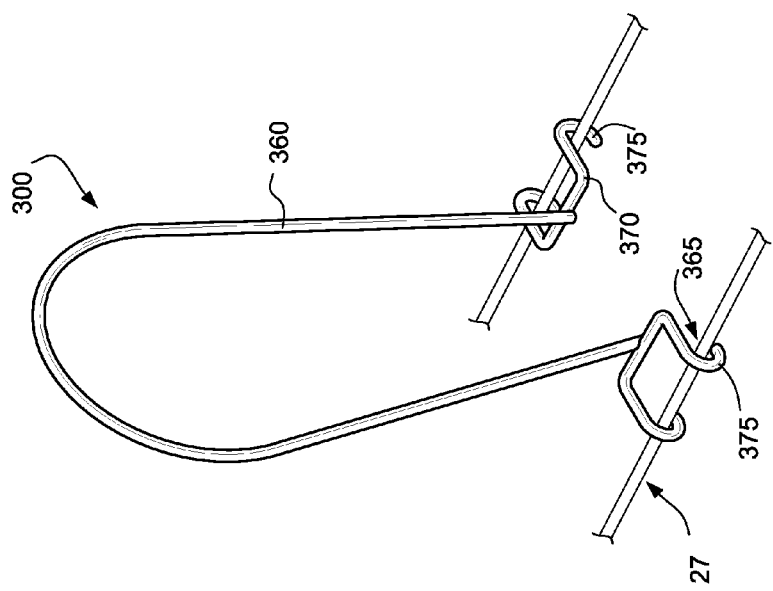
FIG. 16 is a perspective view thereof.
Figure 15:
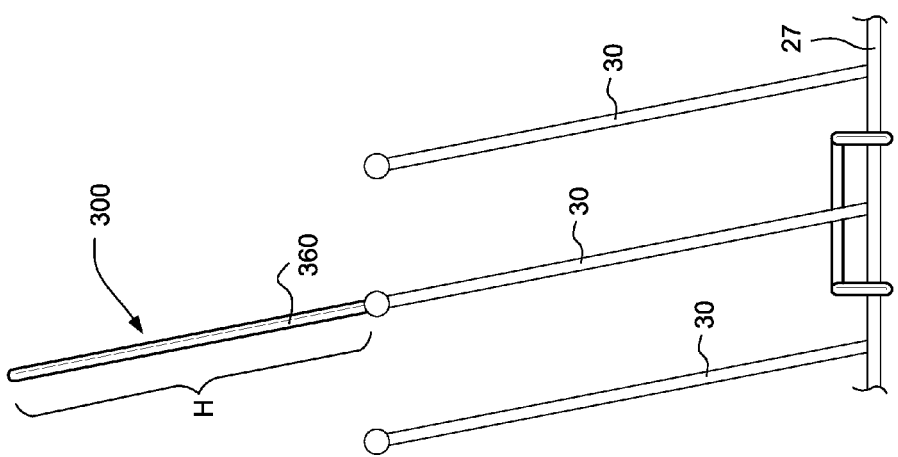
FIG. 15 is a side view of an accessory according to yet another example of the present technology.

FIGS. 15 and 16 show another example of an accessory 300 according to the present technology. Accessory 300 is similar to accessory 45, but has an exposed height H, i.e., the amount it rises above the tines 30, that is greater than the exposed height h shown in FIG. 3 in relation to accessory 45. The greater height H allows for better and/or more complete support of even taller pieces of crockery, e.g., cookie sheets. The exposed height H is approximately 10-15 cm.

FIG. 16 also shows that the claw 365 to have a slightly different shape. Specifically, the claw 365 includes a cross member 370 and a hook 375, as above, but the hook 375 is generally radiused rather than being angled relative to the cross member 370.

FIGS. 17-22 show another variant of an accessory 400 according to the present technology. Accessory 400 includes a proximal end 450 and a distal end 455, but the proximal end 450 attaches onto the crockery basket in a different manner as compared to the examples discussed above. For example, the accessory 400 is U-shaped and includes first and second legs 460, the proximal end of which is connected to the tines 30 (FIG. 22). In the specific example shown each end 450 has a hollow tip portion 451 dimensioned to receive the end 30.1 of an existing tine 30 of the crockery basket 25. Specifically, the inner diameter d of the hollow tip portion is about equal to, or slightly greater or less than, the diameter D (or cross sectional dimension) of the end 30.1 of tine 30. The hollow tip portions 451 may take the form of a blind bore to limit the insertion depth (e.g., 1-2 cm) of the tines 30 into the hollow tip portions 451 of the accessory 400.

As shown in FIG. 18, accessory 500 has a general "U" shape, with the distal and proximal ends being in the same general plane, as also shown in FIGS. 19-21. The distal end provides a smooth surface such that crockery, e.g., a plate or pan 499 (FIG. 22) with a shallow concavity, can be supported in a position that is more ideal for dishwashing machines and without scratching and with improved stability.

FIGS. 23-28 show an accessory 500 according to another aspect of the present technology. Accessory 500 shares many similarities with accessory 400. One main difference is that the accessory 500 has a more pronounced three dimensional shape to better support crockery with a deeper bowl area, as shown in FIG. 28. The accessory may have a pre-defined shape, or it may start off in a generally planar state as in the accessory 400 and be bent or shaped to match the general dimensions or depth of the crockery to be supported, e.g., by plastic deformation and/or by elastic deformation due to the weight of the crockery.

Accessory 500 has a generally U-shape with a pair of legs 560 or proximal portions 550 and a connecting portion 556 or distal portion 555 that connects the legs 560 to one another. Legs 560 have hollow tips 551 as described above, and begin to curve at a distance 553 that is about two thirds of the total height 554 of the accessory 500. The connecting portion 556 extends at an angle δ that is about 50-80 degrees relative to the legs 560. This shape helps to support bowls or other deeply concave crockery, e.g., pots.

While the accessory shown in FIGS. 23-28 includes hollow ends that receive tines of the basket, in an alternative, the accessory 500 may be attached to the basket using an attachment mechanism like those shown and described in relation to FIG. 8 or FIG. 9, e.g., claw like attachment mechanism.

While the present technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the disclosure.

What is claimed is:

1. An accessory for a dishwasher for washing crockery, the dishwasher having at least one crockery basket with a plurality of upstanding tines, said accessory comprising:
   a main body having a distal end configured to support the crockery and a pair of legs extending away from the distal end in cantilever fashion, each of the pair of legs having a proximal end, and each proximal end further comprising a hollow tip portion structured to receive one of the plurality of upstanding tines of the crockery basket within the hollow tip portion,
   wherein the distal end follows a curved path between the pair of legs such that the main body is generally U-shaped to provide a smooth surface to support the crockery, said main body retaining a general U-shape when not attached to the plurality of upstanding tines of the at least one crockery basket, wherein at least a portion of the main body comprises a plastically deformable material or an elastically deformable material, wherein the main body is adjustable, and wherein the main body is adjustable in shape in dependence on shape and/or size of the crockery.

2. The accessory for a dishwasher for washing crockery according to claim 1, wherein at least a portion of the main body comprises the plastically deformable material.

3. The accessory for a dishwasher for washing crockery according to claim 1, wherein the distal end comprises the plastically deformable material, said plastically deformable material further comprising a plastically deformable malleable wire that is structured to be manually bendable to approximate the shape of the crockery to be supported.

4. The accessory for a dishwasher for washing crockery according to claim 1, wherein at least a portion of the main body comprises elastically deformable material, the elastically deformable material being configured to change shape when supporting an item of crockery and is configured to resiliently return to its initial shape when the item is removed.

5. The accessory for a dishwasher for washing crockery according to claim 1, wherein at least a portion of the main body includes an adjustment mechanism to allow selection of a plurality of predetermined positions.

6. The accessory for a dishwasher for washing crockery according to claim 5, wherein the adjustment mechanism comprises a plurality of corrugations that allow adjustment of the main body relative to the plurality of upstanding tines in the crockery basket.

7. A dishwasher comprising:
a compartment;
a door to selectively provide access to the compartment;
a crockery basket within the compartment and including a base; and
the accessory according to claim 1 releasably attached to the crockery basket, wherein the base of the crockery basket is adapted to support a lower portion of the crockery and the accessory is adapted to support an upper portion of the crockery.

8. The accessory for a dishwasher for washing crockery according to claim 1, wherein the main body comprises a single body that is unitary and continuous.

9. The accessory for a dishwasher for washing crockery according to claim 1, wherein the hollow tip portion has an inner diameter that is equal to, slightly greater than, or slightly less than an outer diameter of a corresponding one of the plurality of upstanding tines of the crockery basket.

10. The accessory for a dishwasher for washing crockery according to claim 9, wherein the hollow tip portion further comprises a blind bore.

11. The accessory for a dishwasher for washing crockery according to claim 10, wherein the blind bore is 1-2 cm in depth.

12. The accessory for a dishwasher for washing crockery according to claim 1, wherein the main body is shaped such that the distal end, the pair of legs, and each proximal end lie in a common in plane when the main body is in an undeformed state.

13. The accessory for a dishwasher for washing crockery according to claim 12, wherein the main body is configured to be bent or shaped by elastic deformation or plastic deformation to match the general dimensions or depth of the crockery.

14. The accessory for a dishwasher for washing crockery according to claim 1, wherein at about two-thirds of the total height of the accessory the main body is curved from the pair of legs to the distal end.

15. The accessory for a dishwasher for washing crockery according to claim 14, wherein the pair of legs substantially lie in a first plane and the distal end substantially lies in a second plane in an undeformed state, the second plane being positioned at an angle relative to the first plane of about 50-80 degrees.

* * * * *